US010783122B2

(12) United States Patent
Farber et al.

(10) Patent No.: US 10,783,122 B2
(45) Date of Patent: Sep. 22, 2020

(54) METHOD AND APPARATUS FOR RECORDING AND MANAGING DATA OBJECT RELATIONSHIP DATA

(75) Inventors: Joel Frank Farber, San Jose, CA (US); Teresa Lynn Leamon, San Jose, CA (US); David Ray Schwartz, Morgan Hill, CA (US); Bryan Frederick Smith, Morgan Hill, CA (US); Donald Allan Weil, San Jose, CA (US)

(73) Assignee: SERVICENOW, INC., Santa Clara, CA (US)

( * ) Notice: Subject to any disclaimer, the term of this patent is extended or adjusted under 35 U.S.C. 154(b) by 1673 days.

(21) Appl. No.: 11/777,254

(22) Filed: Jul. 12, 2007

(65) Prior Publication Data

US 2008/0016026 A1    Jan. 17, 2008

Related U.S. Application Data

(63) Continuation of application No. 10/141,776, filed on May 10, 2002, now Pat. No. 7,290,007.

(51) Int. Cl.
*G06F 16/21* (2019.01)
*G06F 16/17* (2019.01)
*G06F 16/901* (2019.01)

(52) U.S. Cl.
CPC .......... *G06F 16/21* (2019.01); *G06F 16/1734* (2019.01); *G06F 16/9024* (2019.01);
(Continued)

(58) Field of Classification Search
CPC ......... G06F 17/30289; G06F 17/30144; G06F 17/30958; G06F 17/30943;
(Continued)

(56) References Cited

U.S. PATENT DOCUMENTS 5,467,471 A    11/1995  Bader
5,469,562 A *  11/1995  Saether ............... G06F 11/1474
                                                       711/100
(Continued)

FOREIGN PATENT DOCUMENTS

JP    10187431 A    7/1998

OTHER PUBLICATIONS

Austin, T.M. and G.S. Sohi "Dynamic Dependency Analysis of Ordinary Programs", ACM SIGARCH Computer Architecture News, vol. 20, No. 2, May 1992, pp. 342-351.*
(Continued)

*Primary Examiner* — Neveen Abel Jalil
*Assistant Examiner* — Hubert Cheung
(74) *Attorney, Agent, or Firm* — Fletcher Yoder, P.C.

(57) ABSTRACT

The invention relates to a method and apparatus for recording and maintaining stored information system object relationship information. Information contained within a stored information system (including system catalogs, referential constraints, triggers, table hierarchies, column references, indexes, stored program packages, system catalogs, stored procedures, stored queries, log/trace files of dynamically executed code, etc.) are searched to identify dependency relationships between objects. This object relationship information is stored and maintained in an information base. Information within the information based may be organized based upon subsets of objects that support a common application, service, or capability. Object relationship data is used to facilitate stored information system administration activities such as generating/restoring from archives, physically/logically segmenting data objects, replicating data objects; optimizing the distribution of data in distributed data system; and estimating operational capacity.

61 Claims, 8 Drawing Sheets

(52) U.S. Cl.
CPC .................. Y10S 707/99943 (2013.01); Y10S 707/99944 (2013.01)

(58) Field of Classification Search
CPC ......... G06F 17/30941; G06F 17/30221; G06F 17/30589; G06F 17/30292; G06F 17/30294; G06F 17/30297; G06F 17/30303; G06F 17/30306; G06F 17/30309; G06F 16/21; G06F 16/9024; G06F 16/1734; Y10S 707/99943; Y10S 707/99944
See application file for complete search history.

(56) References Cited

U.S. PATENT DOCUMENTS

| | | | |
|---|---|---|---|
| 5,488,714 A | 1/1996 | Skidmore | |
| 5,586,328 A * | 12/1996 | Caron et al. .................. | 717/146 |
| 5,613,099 A | 3/1997 | Erickson et al. | |
| 5,615,367 A | 3/1997 | Bennett et al. | |
| 5,630,072 A | 5/1997 | Dobbins | |
| 5,652,880 A | 7/1997 | Seagraves | |
| 5,720,008 A * | 2/1998 | McGuinness et al. ......... | 706/50 |
| 5,745,895 A * | 4/1998 | Bingham ................ | G06F 16/40 |
| 5,745,896 A | 4/1998 | Vijaykumar | |
| 5,757,669 A | 5/1998 | Christie et al. | |
| 5,787,275 A | 7/1998 | Li | |
| 5,845,119 A * | 12/1998 | Kozuka et al. ............... | 717/107 |
| 5,854,932 A | 12/1998 | Mariani et al. | |
| 5,940,835 A | 8/1999 | Sit | |
| 5,991,535 A | 11/1999 | Fowlow et al. | |
| 6,105,046 A | 8/2000 | Greenfield et al. | |
| 6,115,703 A * | 9/2000 | Bireley ............... | G06F 17/3048 707/704 |
| 6,182,117 B1 | 1/2001 | Christie et al. | |
| 6,223,343 B1 | 4/2001 | Hopwood et al. | |
| 6,226,792 B1 | 5/2001 | Goiffon et al. | |
| 6,256,627 B1 * | 7/2001 | Beattie et al. | |
| 6,314,434 B1 * | 11/2001 | Shigemi ................ | G06F 16/289 707/695 |
| 6,363,391 B1 * | 3/2002 | Rosensteel, Jr. | |
| 6,385,563 B1 * | 5/2002 | Vora et al. ......... | 703/6 |
| 6,408,312 B1 | 6/2002 | Forthman et al. | |
| 6,427,230 B1 | 7/2002 | Goiffon et al. | |
| 6,442,753 B1 | 8/2002 | Gerard et al. | |
| 6,502,102 B1 * | 12/2002 | Haswell et al. | |
| 6,598,058 B2 * | 7/2003 | Bird .................. | G06F 17/30595 |
| 6,633,869 B1 * | 10/2003 | Duparcmeur ........... | G06F 17/30 707/6 |
| 6,714,943 B1 * | 3/2004 | Ganesh ............... | G06F 17/3051 |
| 6,728,719 B1 * | 4/2004 | Ganesh ............. | G06F 16/24552 |
| 6,735,598 B1 * | 5/2004 | Srivastava ................ | 707/103 R |
| 6,785,882 B1 * | 8/2004 | Goiffon et al. ............... | 717/120 |
| 6,789,251 B1 | 9/2004 | Johnson | |
| 6,804,672 B1 * | 10/2004 | Klein ...................... | G06F 16/23 |
| 6,816,874 B1 * | 11/2004 | Cotner et al. .................. | 707/769 |
| 6,889,247 B2 | 5/2005 | Christie et al. | |
| 6,910,112 B2 * | 6/2005 | Berkowitz et al. ........... | 711/162 |
| 6,948,038 B2 * | 9/2005 | Berkowitz et al. ........... | 711/162 |
| 7,055,130 B2 * | 5/2006 | Charisius et al. ............ | 717/108 |
| 7,076,764 B2 | 7/2006 | Kramer | |
| 7,137,112 B2 | 11/2006 | Lovvik et al. | |
| 7,162,599 B2 * | 1/2007 | Berkowitz et al. ........... | 711/162 |
| 7,171,646 B2 | 1/2007 | Charisius et al. | |
| 7,376,937 B1 * | 5/2008 | Srivastava ............... | G06F 8/427 717/126 |
| 7,418,619 B1 * | 8/2008 | Uhlmann et al. .................. | 714/2 |
| 7,620,665 B1 * | 11/2009 | George et al. | |
| 2001/0013030 A1 * | 8/2001 | Colby ............... | G06F 16/24539 |
| 2001/0049682 A1 | 12/2001 | Vincent et al. | |
| 2002/0065827 A1 * | 5/2002 | Christie ................ | G06Q 10/10 |
| 2002/0082901 A1 * | 6/2002 | Dunning ................ | G06Q 30/02 705/26.63 |
| 2002/0087734 A1 * | 7/2002 | Marshall .................... | G06F 9/50 719/310 |
| 2002/0097253 A1 | 7/2002 | Charisius et al. | |
| 2002/0156792 A1 * | 10/2002 | Gombocz ............... | G06F 16/20 |
| 2003/0037320 A1 | 2/2003 | Lovvik et al. | |
| 2003/0140097 A1 * | 7/2003 | Schloer .......... | 709/203 |
| 2003/0177139 A1 * | 9/2003 | Cameron ................ | G06F 16/81 |
| 2003/0192028 A1 | 10/2003 | Gusler et al. | |
| 2003/0217027 A1 | 11/2003 | Farber et al. | |
| 2003/0233224 A1 * | 12/2003 | Marchisio ............. | G06F 17/271 704/4 |
| 2004/0133875 A1 | 7/2004 | Kramer | |
| 2004/0205718 A1 * | 10/2004 | Reynders .............. | G06F 8/4441 717/124 |
| 2004/0236916 A1 * | 11/2004 | Berkowitz et al. .......... | 711/162 |
| 2004/0249968 A1 * | 12/2004 | Srivstava ...................... | 709/231 |
| 2005/0125800 A1 | 6/2005 | Himmer et al. | |
| 2005/0268283 A1 | 12/2005 | Clemm et al. | |
| 2006/0064681 A1 | 3/2006 | Robinson | |
| 2006/0149768 A1 | 7/2006 | McCormack et al. | |
| 2006/0149769 A1 | 7/2006 | McCormack et al. | |
| 2007/0143358 A1 * | 6/2007 | Sasaki et al. ................. | 707/201 |

OTHER PUBLICATIONS

Chandra, C. and C.V. Ramamoorthy "DOMINO: A System for Maintaining the Consistency of Software Objects", IEEE, 1994, pp. 111-120.*

Daou, B., R.A. Haraty and N. Mansour "Regression Testing of Database Applications", Proceedings of the 2001 ACM Symposium on Applied Computing (SAC 2001), pp. 285-289.*

Wikipedia, "Tracing (Software)" printed on Mar. 28, 2016.*

R.R. Burton, et al.; "Overview and Status of DoradoLisp"; Proceedings of the 1980 ACM Conference on LISP and Functional Programming; 1980; pp. 243-247.

D.E. Perry; "Software Interconnection Models"; Proceedings of the 9$^{th}$ International Conference on Software Engineering; 1987; pp. 61-69.

Y.F. Chen, et al.; "The C Information Abstraction System"; IEEE Transactions on Software Engineering; vol. 16; No. 3; Mar. 1990; pp. 325-334.

P.G. Selfridge; "Knowledge Representation Support for a Software Information System"; Proceedings of the 7$^{th}$ Conference on Artificial Intelligence Applications; Feb. 24-28, 1991; pp. 134-140.

G. Fischer, et al.; "Cognitive Tools Locating and Comprehending Software Objects for Reuse"; Proceedings of the 13$^{th}$ International Conference on Software Engineering; May 13-16, 1991; pp. 318-328.

P. Devanbu, et al.; "LaSSIE: A Knowledge-Based Software Information System"; Communications of the ACM; vol. 34; No. 5; May 5, 1991; pp. 34-49.

T.M. Austin, et al.; "Dynamic Dependency Analysis of Ordinary Programs"; ACM SIGARCH Computer Architecture News; vol. 20; No. 2; May 1992; pp. 342-351.

C. Chandra, et al.; "DOMINO: A System for Maintaining the Consistency of Software Objects"; IEEE; 1994; pp. 111-120.

G.A. Larson; "Finding Database Object Dependencies"; downloaded from www.datajournal.com; Dec. 30, 2005.

"OraDep: Tool for Oracle Object Dependencies Analyzing"; downloaded from samtrest.com; Jan. 8, 2007.

"Tip of the Month: Finding Object Dependencies"; downloaded from 222.bijoos.com; Jun. 2000.

"Oracle PL/SQL Programming, Second Edition"; Sebastopol: O'Reilly & Associates, section 23.6 Using SQL to Examine Stored Objects; 2000.

G. Mathew; "DB Tools for Oracle by SoftTree Technologies"; downloaded from orafaq.cs.rmit.edu/au; May 10, 2001.

B. Daou, et al.; "Regression Testing of Database Applications"; Proceedings of the 2001 ACM Symposium on Applied Computing (SAC 2001); pp. 285-289.

A. Clark; "Manage Multiple Databases"; downloaded from www.ftponline.com; Apr. 2002.

IBM; IBM DB2 Recovery Expert for Multiplatforms; product brochure; 2002.

(56) References Cited

OTHER PUBLICATIONS

Oracle; "Oracle9i Database Concepts"; document A96524-01, chapter 15 Dependencies Among Schema Objects; 2002.
Rauch Associates; "Comparison of Management Cost of Ownership: Oracle9i Database Release 2 and IBM DB2 v8.1"; Apr. 2003.
Oracle; "Oracle 7 Server Concepts Manual"; chapter 16; Dependencies Among Schema Objects; 1996.
M. Shoji; "Influence Analytic Method for Existent Computer Software"; machine translation of Japanese patent publication 10-187431; Jul. 21, 1998.
Oracle; "Oracle8i Concepts, Release 8.1.5"; document A67781-01, chapter 21; Oracle Dependency Management; 1999.
"Oracle SQL *Plus: The Definitive Guide"; Sebastopol: O'Reilly & Associates, chapter 6, Exploring Your Database; 1999.

* cited by examiner

METHOD AND APPARATUS FOR RECORDING AND MANAGING DATA OBJECT RELATIONSHIP DATA

This is a continuation of application Ser. No. 10/141,776 filed May 10, 2002 in the United States Patent and Trademark Office. The entire disclosure of the prior application, application Ser. No. 10/141,776 is hereby incorporated by reference.

BACKGROUND OF THE INVENTION

Field of the Invention

The invention relates to stored information systems. More particularly, it relates to the recording and management of relationships between data objects and their dependencies and can identify and manage families or sets that need to be treated as a unit.

Description of the Related Art

Today's stored information systems (e.g., database management systems, file management system, etc.) optionally allow objects defined within the system to be related to (i.e., dependent upon) other objects defined within the stored information system in numerous complex ways. Often these interdependency relationships are not easily identifiable or documented as participating in an application set (i.e., a set of files/database tables/metadata, etc. that needs to be maintained as a consistent unit at all times). While it is common to have good documentation of individual objects and their parts, relationships between all objects included in an application are not, generally, fully documented. This is due, in part, to the breadth of detail associated with capturing a complete set of object relationships related to a specific application set. The granularity of the required information spans from complete objects to elements. Furthermore, the human effort required to collect and continuously maintain such an information base is significant and a single omission can negate the value of all efforts made.

An application set includes documented and undocumented relationships between objects associated with an application or capability supported by the stored information system. To assure consistency, objects associated with an application set should be treated on an all or nothing basis. For example, backup and recovery operations should include all tables and other objects associated with an application set to assure integrity of all the information needed to support the common application or capability.

Consistency of the application set requires backup and recovery of all the objects in the set to the same point in time. Knowing the objects associated with an application set, therefore, is very useful knowledge for planning backup and recovery strategies, storage assignments, disaster recovery, performance analysis, archiving, selective partial archiving, relocation, replication, capacity planning and other uses.

Computer based systems undergo constant maintenance and migration of objects and applications. With addition, deletion, and archiving of objects and applications it is common for one or more objects associated with an application set to be omitted from critical administrative procedures, thus jeopardizing the integrity of the application set and jeopardizing full operational processing capability, either immediately, or at some future point in time when, for example, defective archives are used in an attempt to restore a fully operational system. This is especially true for internally developed applications with which support staff may be unfamiliar and/or applications containing some stored information system objects the use of which is occasional or dynamic.

Hence, there remains a strong need for methods, apparatuses, and interfaces that allow stored information system object relationship information to be discovered, stored and maintained. Further, there is a strong need for object relationship information that can be used to streamline stored information system administration processes and to assure consistency of stored information system application sets.

SUMMARY OF THE INVENTION

Therefore, in light of the above, and for other reasons that will become apparent when the invention is fully described, a method and apparatus for searching, identifying, storing and maintaining stored information system object relationship information is described.

Relationships among objects in a stored information system are discovered by searching for dependencies between data objects and storing the identified dependencies in an information base. Some of these relationships that are discovered will be expected, while other discovered relationships will be unexpected.

Information contained within a stored information system (including system catalogs, schemas, referential constraints, triggers, data hierarchies, column references, application packages, stored procedures, stored queries, control blocks, etc.) are searched to identify dependency relationships between objects. Object relationships are further identified by scanning trace/log files of stored information system activity and of the execution of dynamic queries/applications. Object relationships may also be manually specified via an administration interface. One of the problems resolved is that many applications extensively, or exclusively, use dynamic calls and there are no persistent structures exposing the object relationships that exist during execution. Therefore, such dynamic relationships are discovered by scanning stored information system logs or traces of executed applications.

This object relationship information is stored and maintained in an information base. Information within the information base can be organized based upon subsets of objects that support a common application, service, or capability. Object relationship subset data can be used to facilitate administration activities such as generating/restoring from archives; physically/logically segmenting data objects; replicating data objects; optimizing the distribution of objects and data in distributed data systems; and estimating operational capacity. User administrator control instructions are received via the administration interface and are used to control object dependency searches, storage of object relationship information and use of stored dependency information to manage data objects.

The above features and advantages of the invention will become apparent upon consideration of the following descriptions and descriptive figures of specific embodiments thereof. While these descriptions go into specific details, it should be understood that variations may and do exist and would be apparent to those skilled in the art based on the descriptions herein.

DETAILED DESCRIPTION

Figure 1:
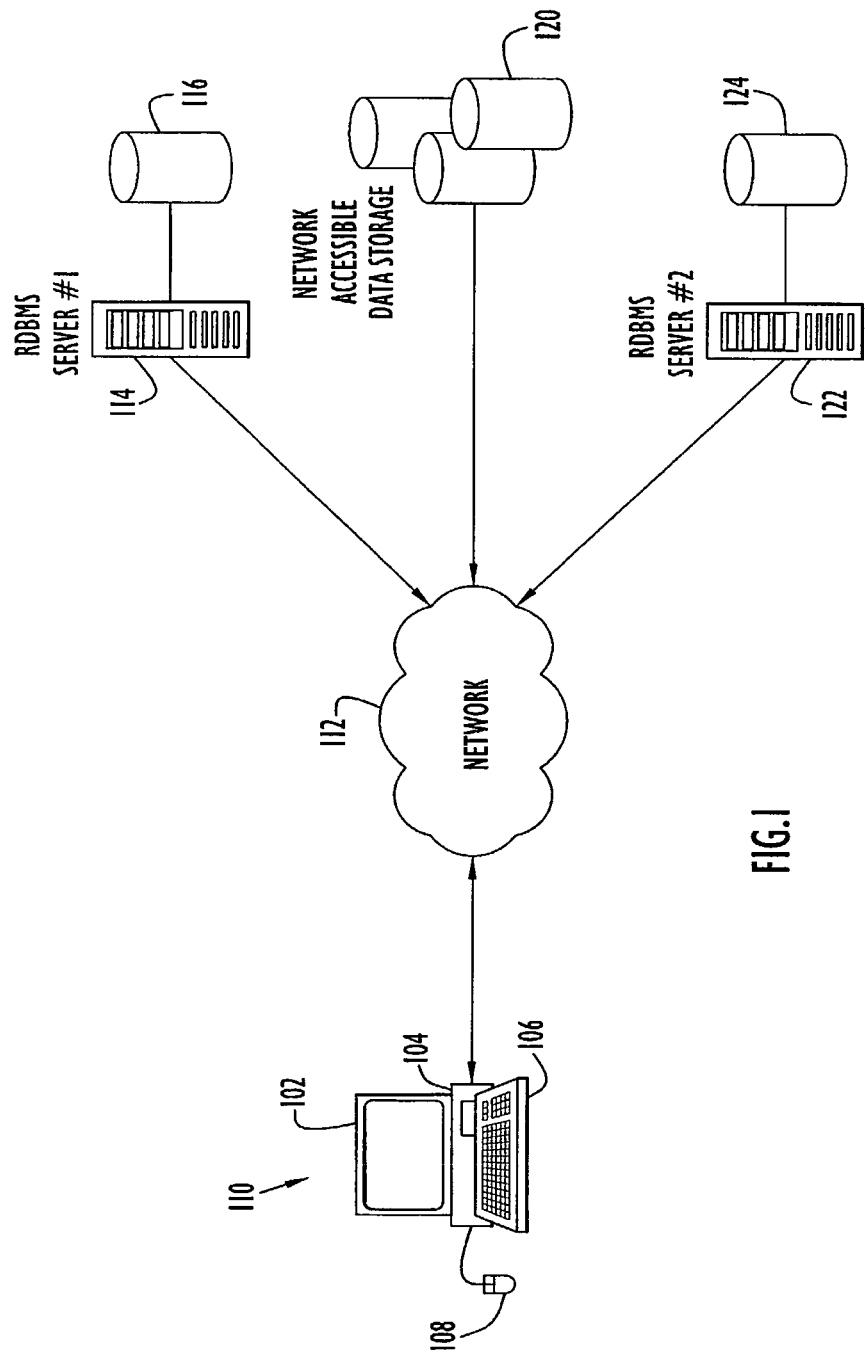
FIG. 1 depicts a networked computing environment typical of the environment in which methods and apparatuses described herein will be used.

The embodiments described below are described with reference to the above drawings, in which like reference numerals designate like components.

Methods and apparatuses are described here for discovering dependencies between objects in a stored information system and recording and maintaining the discovered object dependencies in a comprehensive information base. This information base is used to identify application sets consisting of objects that support specific stored information system applications/capabilities.

Inter-object dependencies can be tracked and managed with either a coarse or fine grained resolution. Automated location, augmentation, and management of stored information system object relationship information greatly reduces the human effort required to collect and maintain a comprehensive information base of object relationships. The information base supports identification of application sets that serve as the basis for enhancing stored information system administration and maintenance to insure that no objects are overlooked during any phase of administration activities. The automated object relationship techniques described can be executed on a periodic basis or continuously to assure that the maintained information base of object relationships and application set groupings accurately reflect the current stored information system environment. Furthermore, administrators can manually edit and augment object relationship information using techniques that efficiently and effectively integrate manually augmented relationship data with the described automated discovery techniques.

Knowledge of application sets allows a system administrator to implement effective strategies for backup and recovery, disaster recovery, storage assignments, performance analysis, archiving, selective partial archiving, relocation, replication, capacity planning and other activities that streamline administrative procedures and assure the integrity and consistency of an application set, thereby maximizing the integrity, availability and reliability of data stored within the stored information system.

A system capable of supporting multiple embodiments of a administrative tool for discovering, recording and maintaining object relationships and for managing the stored information system based upon knowledge of sets of related objects (i.e., application sets) that support one or more identified applications/capabilities is illustrated in FIG. 1.

Given the distributed nature of modern stored information systems, the methods and apparatuses described here are applicable to a wide range standalone and networked operational environments. For example, a modern stored information system (such as IBM Corporation's DB2®) is capable of presenting a transparent interface to information that is distributed across numerous disparate physical devices interconnect via a network. Specifically, the system can include a stored information system administration client 110 in an end-user computer system in communication with or connected to a network 112, such as the Internet, and one or more stored information system server computer systems (114 and 122), each with their respective storage devices (116 and 124), and with other network addressable data storage devices 120.

The administration client 110 can be a conventional personal or other suitable computer system (e.g., lap top, desktop, PDA, etc.) preferably equipped with a display or monitor 102, a system unit 104 (e.g., including the processor, memory and internal or external communications devices (e.g., modem, network cards, etc.)), a keyboard or other entry device 106 and optional mouse 108 or other pointing device. The administration client 110 includes administration client software (e.g., operating system, network/communications software, administration client software, Internet browser, etc.) and appropriate components (e.g., processor, disk storage or hard drive, etc.) having sufficient processing and storage capabilities to effectively execute the software. Preferably, the end-user system uses any one of the well-known operating systems.

Similarly, a stored information system server system (114, 122) is typically implemented by a conventional personal or other suitable server computer system and preferably equipped with a system unit (e.g., including the processor, memories and internal or external communication devices (e.g., modem, network cards, etc.)) and optional display and input devices (e.g., a keyboard or other entry device, a mouse or other pointing device, etc.). The server system can include software (e.g., operating system, network/communications software, stored information system, etc.) to communicate with end-user system 110 and process requests, and appropriate components (e.g., processor, disk storage or hard drive, etc.) having sufficient processing and storage capabilities to effectively store stored information system data. A stored information system server system preferably uses any of the commercially available operating systems, databases and/or server software, and, under software control, can employ any stored information system (e.g., IBM Corporation's DB2® and related information store. A network accessible data storage device 120 is any commercially available device capable of providing storage capacity to one or more local or remote stored information systems.

Figure 2:
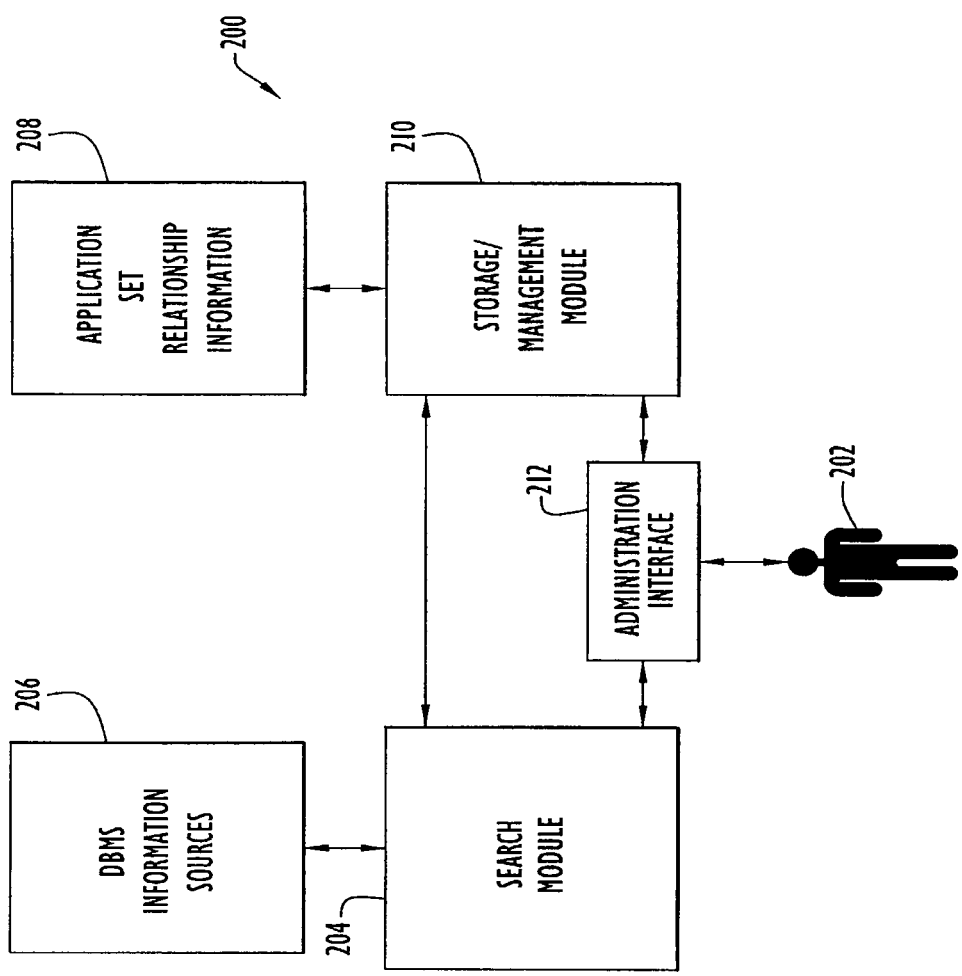
FIG. 2 is a non-limiting, representative system level block diagram of a data object relationship management tool.

FIG. 2 depicts a non-limiting, representative diagram of components that comprise an administrative tool 200 for discovering, recording and maintaining stored information system object relationships and for managing the stored information system based upon knowledge of sets of related objects that support one or more identified stored information system applications/capabilities (i.e., application sets). These components include program instructions recorded on a computer-readable medium, such as a magnetic disk, optical disk, semiconductor memory, or other computer-readable medium. A search module 204 that accesses stored information sources 206 and retrieves object relationship information that it passes to a storage/management module 210. The storage/management module 210 organizes the object relationship information collected into application sets and permanently stores the relationship information 208 within the stored information system. A system administrator 202 interacts with both the search module 204 and the storage/management module 210 via an administration interface 212. The administration interface 212 allows the administrator 202 to issue control instructions to the search module 204 for searching and collecting object relationship information and to issue instructions to the storage/management module 210 with respect to the storage and management of application sets. Furthermore, the administration interface 212 allows the administrator 202 to retrieve previously stored application set dependency information 208 via the storage/management module 210 and to initiate administrative procedures, the focus and execution of which is upon objects identified within the retrieved application set dependency information.

Figure 3:
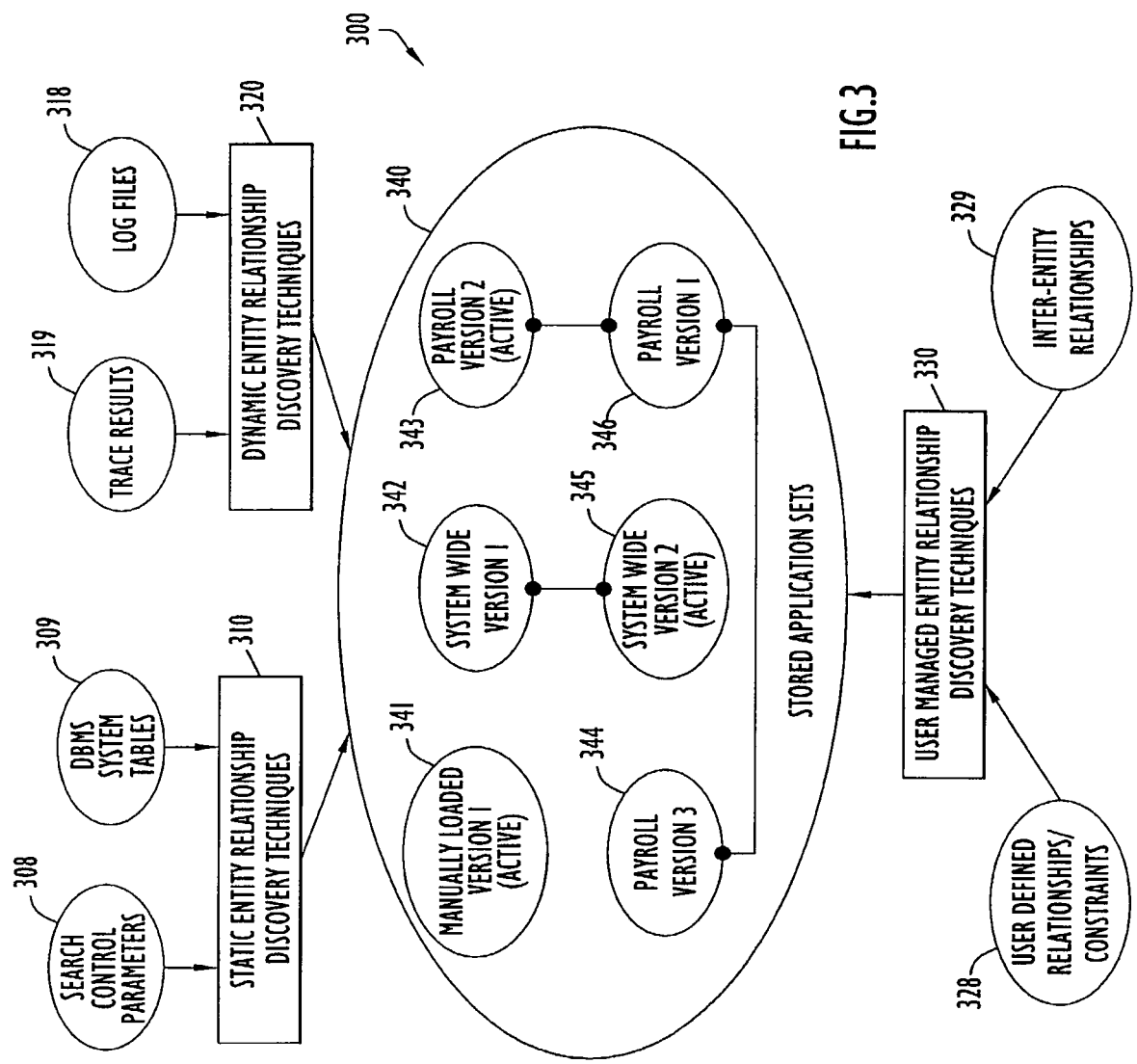
FIG. 3 is an information flow diagram depicting the flow of information associated with the collection and storage of data object relationships.

FIG. 3 presents an information flow 300 associated with collecting stored information system object relationship information. As depicted in FIG. 3, a wide variety of data collection techniques which include static object relationship discovery techniques 310, dynamic object relationship discovery techniques 320, and user managed object relationship discovery techniques 330 can be used to search for and identify stored information system object relationships. Once identified, these object relationships are organized into application sets 340 based upon the stored information system applications services and capabilities supported by the objects.

As depicted in FIG. 3, static relationship discovery techniques 310 are used to search information contained in stored information system catalogs and tables 309. The extent of these searches is controlled with system or user supplied search control parameters 308 provided to a search module via the administration interface, as described in relation to FIG. 2. Dynamic relationship discovery techniques 320 are used to search log files 318 and trace results 319 generated as a result of dynamically executing applications, queries, and other operations within the stored information system. User managed relationship discovery techniques 330 are used to record user defined relationships/constraints 328 and inter-object relationships 329 manually augmented by a stored information system administrator. Object relationships discovered using these varied techniques are organized into application sets 340 and stored within the stored information system. In FIG. 3, three application sets are depicted. The application set labeled "Payroll" has three stored versions (343, 344, and 346) among which version 2 is identified as the active set for use in support of stored information system administration. The application set labeled "System Wide" has two stored versions (342 and 345) among which version 2 is also identified as the active set for use in support of stored information system administration. The application set labeled "Manually loaded" has only a single stored version (341) which is identified as the active set for use in support of stored information system administration.

Relationship Discovery

Static Relationship Discovery Techniques—

As depicted in FIG. 3, static relationship discovery techniques 310 controlled with system or user supplied search control parameters 308 are used to search stored information system catalogs, structures or data tables 309 for object relationships. User supplied search parameters 308 are optional and may be provided for any user defined application set. With respect to the default application set, some control parameters are preset and are not user configurable. If provided to the system via the administration interface (212, shown in FIG. 2) the search parameters optionally can be stored in association with a defined application set for use each time the application set is refreshed.

In one non-limiting, representative embodiment, user supplied search control parameters can include:
a) Starting Point—

This parameter defines the starting point for the search. It provides a way for users to limit the scope of the search. If this parameter is not provided (as in the default set), this function will search every user table, which is defined in the catalog. When limited using a starting point, the groupings generated will contain any starting point objects (e.g., tables, packages, etc.) identified and all objects that are directly or indirectly related to those starting point objects. For example, if tableA is related to tableB and tableB is related to tableC, then tableA and tableC are related tables. The starting point parameter will contain a list of one or more objects.

b) To Be Ignored—

This parameter identifies objects (e.g., tables and packages) that should not be included in the groupings. Even though these objects will not be used for the purposes of determining the application sets, they will be identified in every application set in which they occur, along with an indicator that they are to be ignored for application set purposes. During application set discovery with this parameter specified, object relationships for all the objects that are ignored will not be found. This parameter will contain a list of objects (e.g., tables and packages [i.e., bound applications]) and a flag to indicate the type of object.

c) Externally Defined Relationships—

This parameter identifies relationships between objects (e.g., tables and packages) that are externally defined and that cannot be determined from the stored information system catalog or other sources. For example, this parameter can be used to define relationships that exist between packages (e.g., to identify which packages are associated with a single application). In addition, the parameter can be used to identify objects that an application uses in dynamic SQL statements. The information concerning externally defined relationships will be used to group related objects. The parameter will contain a list of application sets containing objects (e.g., packages and tables) as shown in the table below:

| Application set | Object Name | Object Type |
| --- | --- | --- |
| group1 | tab1 | 'T' |
| group1 | tab3 | 'T' |
| group1 | tab4 | 'T' |
| group2 | pkg1 | 'P' |
| group2 | pkg2 | 'P' |
| group1 | pkg3 | 'P' |
| group2 | pkg4 | 'P' |
| group1 | tab2 | 'T' |

User/Administrator Application Set Editor—

As depicted in FIG. 3, at 328, application sets identified by using static relationship discovery techniques, based upon the default or user supplied parameters identified above, can be edited by the user via an application set editor contained within the administration interface. Using the editor a user can make modifications to any of the identified application sets and/or to reverse previously made user changes.

In one non-limiting representative embodiment the editor enables users to make the following application set modifications:

Rename application sets;
Merge application sets (two application sets at a time);
Remove objects from application sets;
Add objects to various application sets;
Reverse previously made modifications;
Manage multiple versions of an application set; and,
Designate a selected version of an application set as the active version.

Note that adding an object from one application set to another application set does not merge the two application sets. To achieve such a result, users have to either manually merge the two application sets via the editor, or rerun the application set discovery function with the externally-defined relationship added as an input parameter, as discussed above. Similarly, when a object is removed from an application set, the application set will not change until the discovery function is re-run again with the 'to be ignored' object added as an input parameter, as discussed above. In one non-limiting representative embodiment, modifications to an application set made through the editor, as discussed above, are stored as one set of changes. A users can undo the most recent modifications based upon this stored set of changes. Once the most recent modifications are undone, the set of modifications preceding the changes that were undone, become the most recent changes (e.g., similar to a last-in-first-out stack operation).

Manually Loaded Object Relationship Data—

As depicted in FIG. 3, at 329, if users have information concerning one or more application sets in a particular data system, they can choose to load object relationship information manually rather (or in addition to) executing the application set relationship discovery techniques. For example, in one non-limiting embodiment, users can input stored information system object relationship information using an XML file as input. The input file contains all or part of the application set relationship information associated with the stored information system of interest. If a relationship is defined that had already been identified in an application set based upon a previous manual load, or via a previously executed automated search, the record associated with the relationship is replaced. A non-limiting representative sample of an XML file format for use in manually loading application set relationship information is provided below.

```
<Data Name="your data name" GrouperSchema="schemaName">
    <Group Name="group name">
        <Table Name="table name" Schema="Schema Name"
    TableSpaceID="Table space ID"
            Include = "Yes or No"> </Table>
        <Table Name="table name" Schema="Schema Name"
    TableSpaceID="Table space ID"
            Include = "Yes or No"> </Table>
            .
            .
            .
        <Table Name="table name" Schema="Schema Name"
    TableSpaceID="Table space ID"
            Include = "Yes or No"> </Table>
    </Group>
    .
    .
```

-continued

```
    <Group Name="group name">
        <Table Name="table name" Schema="Schema Name"
    TableSpaceID="Table space ID"
            Include = "Yes or No"> </Table>
        <Table Name="table name" Schema="Schema Name"
    TableSpaceID="Table space ID"
            Include = Yes or No"> </Table>
            .
            .
            .
        <Table Name="table name" Schema="Schema Name"
    TableSpaceID="Table space ID"
            Include = "Yes or No"> </Table>
    </Group>
</Data>
```

Dynamic SQL Discovery—

As depicted in FIG. 3, at 320, dynamic object relationship discovery techniques are used to identify dynamic relationships between objects. Such object relationships cannot be identified using static discovery techniques (e.g., by searching stored information system tables, stored procedures and bound applications/packages) because the relationships are not referenced by such sources. To identify dynamic relationships, logs or trace records generated by the system are searched to reveal object dependencies/relationships that are dynamically established during the stored information system execution of program generated code.

Application sets are the result of combining object relationships discovered using dynamic discovery techniques, object relationships discovered using static discovery techniques, object relationships received via a user defined input file and user defined relationships and constraints received via the user/administration interface.

The dynamic SQL discovery function may be executed at any time to identify dynamic object relationships associated with newly introduced and/or modified programs. The user can manually control the promotion (i.e., addition) of newly identified relationships to an existing application sets or such promotion can be controlled using an automated rule set.

Operational Overview

Figure 4:
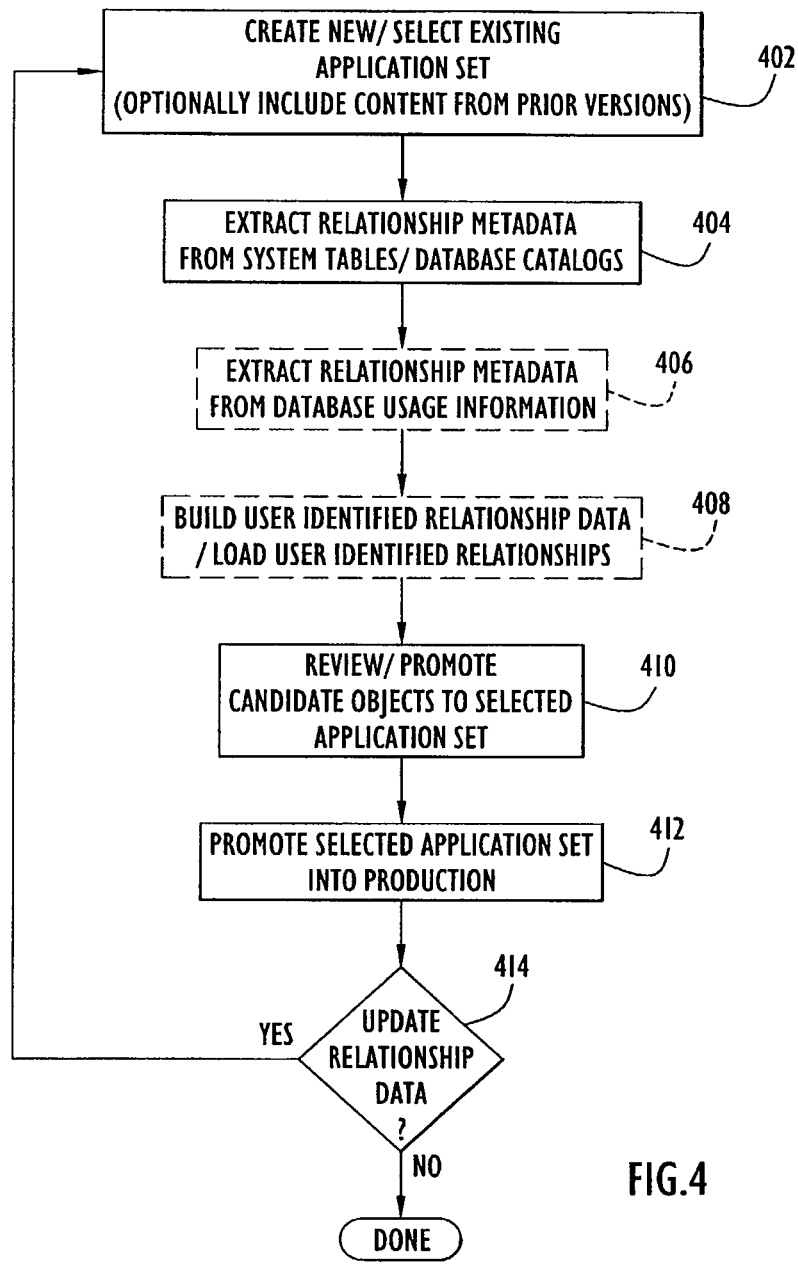
FIG. 4 is a non-limiting, representative flow diagram illustrating a process associated with use of the data object relationship management tool to build and maintain data object relationship information.

FIG. 4 provides an operational process overview of the use of a non-limiting representative embodiment of a stored information system administration tool that employs the object relationship discovery techniques, described above, to facilitate the identification of stored information system object relationships and the development and maintenance of logical application sets based upon the object relationship information obtained.

The first time discovery techniques are executed, or whenever the user/administrator so chooses, a new version of an empty application set is created (operation 402), and becomes the current application set. If prior versions of the application set exist, the administrator decides whether to include all or part of that data into the new persistent information store.

Next, static stored information system object relationship discovery techniques are used to mine/extract relationship metadata from all possible system media, including data tables/catalogs, as previously discussed (operation 404). Discovered object relationship information that duplicates entries in the current application set is discarded. Static stored information system object relationship discovery creates additional unique candidates for updating the current application set. The administrator later reviews and decides which, if any, of the candidate objects and relationships to promote into the current application set at operation 410.

More candidates to augment the current application set are then optionally identified based upon system and data usage information (operation 406) by searching logs/traces of dynamic SQL, and other program code executed by the stored information system. Discovered object relationship information that duplicates entries in the current application set is discarded. These dynamic SQL discovery techniques create additional unique candidates for updating the current application set. The administrator later reviews and decides which, if any, of the candidate objects and relationships to promote into the current application set at operation 410.

Additional candidates with which to augment the current application set are then optionally identified based upon inter-object relationships of a nature that are not visible to the discovery techniques identified above but that are still required to maintain proper operational processing capability (operation 408). These relationships can be added manually via the administration interface or via an API that facilitates adding these relationships in bulk via an import file. Manually added object relationships allow inclusion of object relationships that cannot be captured using the static discovery techniques 404 and dynamic discovery techniques 406 previously described. Duplicate object relationships are discarded.

Next, as previously described in relation to operations 404 and 406, the administrator reviews and decides which of the candidate objects and relationships identified are to be promoted into the current application set (operation 410). In one non-limiting representative embodiment, the discovered and/or manually entered object relationship information is made viewable to the administrator via the administration interface. As the object relationship information is viewed, object relationships can be selectively included within or excluded from the selected application set, based upon input from the administrator. If the new/updated application set version is to be used in support of administration routines, the administrator must schedule and execute promotion of the current version of the application set into production (operation 412).

Using the administration tool described above, the user/administrator can generate new application sets or revised existing application sets as needed (operation 414).

Non-Limiting Representative Administration Interface

This methods and apparatus described can be used to discover and record relationships between objects defined within any stored information system. There are many relationships between the different data objects (e.g., tables) contained in a stored information system catalog, some of which are easily discovered, and others are not so easily found. As a result, users do not understand all these relationships within their data even though this is very useful knowledge to have. It can be used for planning backup and recovery strategies, table space assignments, performance analysis, archiving, relocation, replication, capacity planning, and other uses. The objective of relationship discovery is to enable the location, recording, and administration of this information as a basis for management activities. It has the flexibility to allow the user to easily augment and edit this information to suit their business needs.

The method of operation includes extracting relationship meta data from the stored information system catalog, augmenting this with data from traces of dynamic SQL (the user controls the running of these) or log records, and allowing the user to add relationships, which cannot be captured otherwise. The groupings of the objects are based on these relationships. This captured information is stored and maintained by the information system. This cycle can be repeated as often as the business requires.

An application set, as the name suggests, is a set of groupings. A group is a collection of related objects and a set is a collection of disjoint groups. There is a mandatory default set called 'SystemWide' that includes all groups identified in the system. For example, the 'SystemWide' default can include all groups identified based upon information contained within a stored information system's internal catalogs. The 'System Wide' default set cannot be renamed. An empty default set is provided as part of the installation. It is users' responsibility to load groupings into this set. The default set is meant to hold groupings created after a full catalog crawl and using all the information that has been saved about dynamic applications, by the Dynamic SQL Discovery function. The amount of information that is saved via the Dynamic SQL Discovery function depends on the number of dynamic applications that were run with the trace 'on'. Users are allowed to create various personalized application sets based on the business needs. The application sets are meant to hold a subset of the default groupings based on what the requirements are. For example, users can have an application set for payroll applications, another set to hold user-defined groups (i.e., manually loaded groups), and so on. While creating groupings for the application sets, the extent of catalog crawl and the amount of information about dynamic applications that is considered, will depend on the input parameters to the stored information system discovery function. The groupings for payroll applications, will possibly contain only the objects that are used by the applications and all the objects that are related to these payroll objects. Users can load the groupings into various sets by using discovery controls and/or the administration interface which allows a user to load groupings manually, as previously described.

As shown in FIG. 3, users can have various versions of an application set. Only one of the versions are allowed to be active, at a given time. When users reload the groupings, they can either load them into an existing version or into a newly created version. The contents of each version of an application set will vary from the other versions of the set, if changes were made to the data in between discovery searches (part of the group discovery process), or if the information saved about dynamic applications has changed in between the group discovery process, or if the input parameters to the discovery search have changed. In the case of the default working set, externally-defined relations are the only input parameters that the stored information system discovery search will use, as previously described. Users are not be allowed to load groups into an active version.

Administration Interface Features—

A non-limiting, representative embodiment of the Administration Interface consistent with the above description may include the following capabilities:
 a) Create Application Set: The name of the set (for personalized sets) has to be specified by the users. If users specify an already existing name, a new version of the set are created. The set are empty initially. Users have to load the groups into it either manually (not for the default set), or by using the Group Discovery function.

b) Delete Application Set: This operation will delete the set. Users will not be able to delete a set that is currently active. They will have to deactivate the set before deleting it.
c) Activate Application Set: Users are allowed to activate any version of a set. A set can have only one active version at a time. Before a version of a set is activated, the version of the set that is currently active are deactivated automatically.
d) Deactivate Application Set: Users are allowed to deactivate a personalized set. Users are able to deactivate a version of the default set by activating another version of the set. So, the default set will always have an active version.
e) Rename Application Set: When users rename a set, all versions of the set will automatically be renamed. This operation will not be allowed for the default set.
f) View/Edit Input Parameters to Discovery Function: Users are allowed to maintain input parameters for each working set. All versions of the working set will use the same parameters. Users are allowed to modify and save these parameters. The saved parameters are used by the Group Discovery function while determining the groups.
g) View/Edit Groups: Users are able view and make modifications to the groups belonging to various versions of a set.
h) Load Groups: Users are able to load the groupings by using the Group Discovery function. For personalized set, they will also be able to load the groupings manually.

Internal Table Structures

Upon collection of stored information system object relationship data using any of the described methods and techniques, the information must be stored. In one non-limiting representative embodiment implemented using IBM's DB2®, application set information is stored in three data tables. The Group Name table relates an application set name (GROUPNAME) that is meaningful to the administrator to an application set unique identifier (GROUPID) that is used as a more efficient identifier in subsequent tables. Columns contained in a non-limiting, representative embodiment of the Group Name Table are presented in the table below.

| Group Name Table | |
|---|---|
| GROUPID | A unique integer identifier for the group. |
| GROUPNAME | A variable length character or graphic column (not null with default) for the name of the group. |
| REMARKS | A column where the user can optionally enter meaningful and displayable comments. |

Each application set named in the Group Name Table will have one or more related entries in a Table of Tables. Each table associated with the application set has an entry in the Table of Tables. Columns contained in a non-limiting, representative embodiment of the Table of Tables are presented in the table below.

| Table of Tables | |
|---|---|
| GROUPID | An integer identifier for the group. |
| TABLEID | An integer (not null with default) which is DB2's internal table identifier. |
| TABSCHEMA | A varchar(128) containing schema id for this table. |
| TABNAME | A varchar(128) length character containing the name of the table. |
| TBSPACEID | An integer (not null with default) which is DB2's internal table space identifier. |
| IGNORE | A one character column which will contain either a 'Y' (this object is to be included in the group) or 'N' (this object is not to be included in the group) |
| REMARKS | A varchar or vargraphic not null with default column where the user can optionally enter meaningful and displayable comments. |

Note: It takes the first two columns (GROUPID and TABLEID) to uniquely identify a row in this table. The GroupID column is a foreign key to the Group Name Table.

The ultimate logical data storage object in a relational data is a table. Tables are the objects that analysis of the catalog and traces will all ultimately decompose to. But backup and recovery are not done on a table basis. Rather, they are done on a table space or volume basis. For this reason, the Information Recovery Table, described in the table below, contains rows that define all the physically recoverable objects for each group. The physically recoverable objects are those that backup and restore tools will operate on. In other words, table spaces, volumes and files (datasets). This table contains the relationships between table spaces, volumes and files. A single table can be contained on multiple I/O devices, while a single I/O device could contain all or parts of multiple objects/tables.

The information in the table is replicated into a operating system file so the stored information system administrator tools (such as IBM's Recovery Expert) can perform highly tailored volume/file backup and restores that are effectively tailored to meet application set needs. Columns contained in a non-limiting, representative embodiment of the Information Recovery Table are presented in the table below.

| Information Recovery Table | |
|---|---|
| TBSPACEID | An integer (not null with default) which is an internal table space identifier. Matches the column by the same name in SYSCAT.TABLESPACES. |
| TBSPACE | The name of the table space. It is varchar(18). Matches the column by the same name in SYSCAT.TABLESPACES. |
| NODENUM | The partition or node number of the partition containing this particular container. This is a smallint not null with default. It will take the default value (zero) for non-partitioned DB2 systems (including zOS). |
| DATATYPE | The one character type of data that can be stored in this table space. Matches the column by the same name in SYSCAT.TABLESPACES. |
| VOLUMENAME | The name of the physical volume. For zOS, this is the VOLSER, for workstation, this is the name of a physical volume, not a partition. For example, in Windows, it would not be tic: " or "D: " but something like "Disk 0" or "Disk V. For AIX, it would be PVO, PV I and so on, not hd 1, hd2 and so forth. |
| CONTAINER | The full path (workstation) or fully qualified (zOS) name of the container. This will be a file (dataset), directory or device. |
| IGNORE | A one character column which will contain either aY(this object is to be included in the group) or 'N' (this object is not to be included in the group) The user should normally be excluding tables, rather then table spaces or volumes, but we will give him the capability to exclude at this level as well. |

-continued

| Information Recovery Table | |
|---|---|
| REMARKS | A varchar or vargraphic not null with default column where the user can optionally enter meaningful and displayable comments. |

Note: It takes NODENUM, CONTAINER and either TBSPACEID or TBSPACE to uniquely identify a row.

Relationship Discovery Techniques

As described in relation to FIG. 3, a major source of object relationship data used to identify and define separate application sets is metadata contained within and/or derived from stored information system catalogs and data tables. Such stored information system metadata sources include: table referential constraints; table column references (i.e., table references to other tables that do not impose a stored information system enforced constraint); table hierarchy relationships; column level triggers; application packages; stored procedures/queries; and table references to large objects (e.g., digitized video files) that are stored externally to the referencing table but are managed by the stored information system. The non-limiting, representative descriptions below describe characteristics of stored information system relationship information sources, as applicable to the specific operating systems and databases identified.

Referential Constraints—

Referential constraints are controls placed upon objects that invoke referential integrity checks with other objects. Referential constraints often consist of pairs of keys across two objects. These two identical objects form a relationship between each other. By way of non-limiting example, the catalog table SYSIBM.SYSRELS (for z/OS) and the view SYSCAT.REFERENCES (for Windows/Unix) contains one row for every referential constraint.

When searching for stored information system object relationships based upon referential constraints, using default search control parameters, all tables addressed by the referential constraints contained within identified tables are also considered during the search. All tables that identified referential constraints depend on are put into one group.

Hierarchy—

Figure 8:
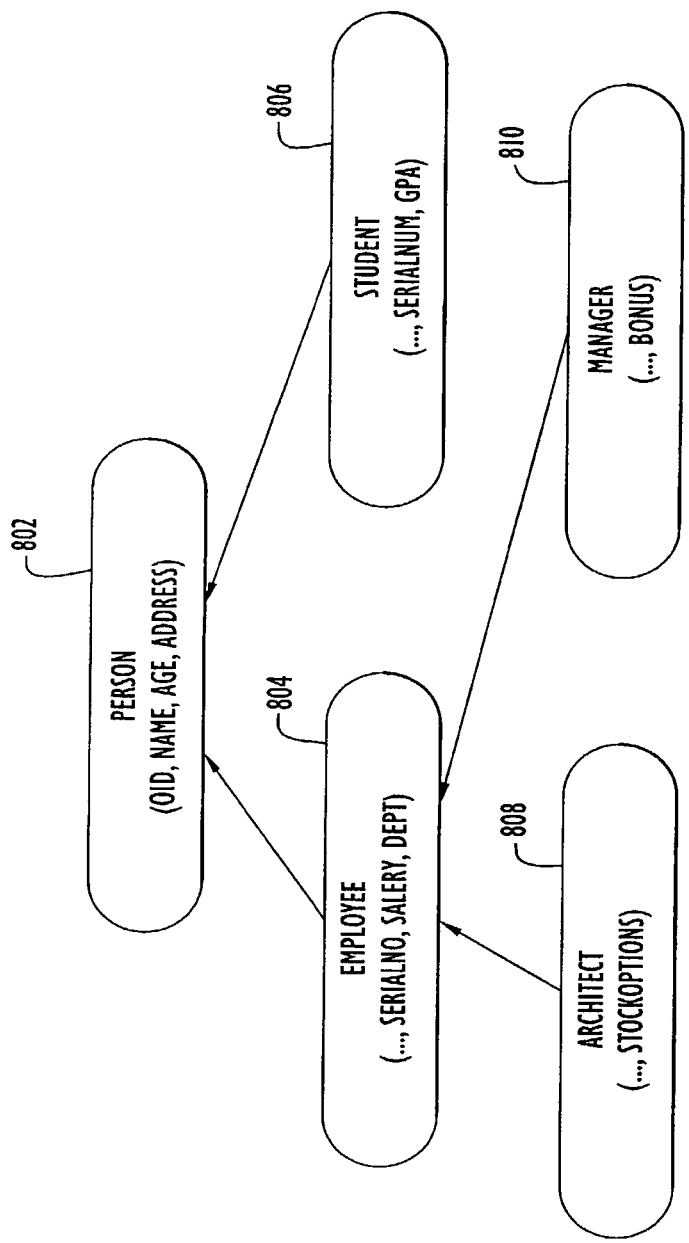
FIG. 8 depicts an illustrative representation of table-hierarchy based relationships that can exist between member tables in a hypothetical set of data tables.

FIG. 8, is a non-limiting representative example of table hierarchy. A table inherits all the columns from the tables above it in the hierarchy. In FIG. 8, for example the Architect table 808 will inherit all the columns from the Employee table 804 and the Person table 802.

By way of non-limiting example, in IBM's DB2® for Windows/UNIX, the catalog view SYSCAT.FULLHIERARCHIES contains information about all hierarchical relationships.

When searching for stored information system object relationships based upon hierarchy, using default search control parameters, all the tables belonging to a table hierarchy will be in the same group. For example, in FIG. 8, all the tables in the above hierarchy, Person 802, Employee 804, Student 806, Architect 808, and Manager 810 will be put into the same group.

Column Reference—

Column references are table references to other tables that do not impose a stored information system enforced constraint. By way of non-limiting example, in IBM's DB2®, the columns SCOPE_TABSCHEMA, and SCOPE_TABNAME in the catalog view SYSCAT.COLUMNS contain information about tables that are referenced. A column of type 'REFERENCE' points to a row in another table.

When searching for stored information system object relationships based upon column references, using default search control parameters, all column references associated with tables that identified column references point to are also considered during the search. All the tables that these column references depend on are put into one group.

Triggers—

A trigger is a stored information system instruction that is executed upon the creation, update, or deletion of a field associated with a table column upon which a trigger has been defined. Often a trigger is used to update fields in other tables to assure consistency with the new or changed value. Triggers may be simple in nature or initiate stored procedures that initiate numerous changes.

By way of non-limiting example, IBM's DB2® catalog table SYSIBM.SYSTRIGGERS (for z/OS) and the view SYSCAT.TRIGGERS (for Windows/Unix) contains a row for each trigger. The full text of the CREATE TRIGGER statement is in the column 'TEXT'. In DB2 for Windows/Unix, there is a view called SYSCAT.TRIGDEP, which contains a row for every dependency of a trigger on some other object. The list of tables that the trigger depends on can be obtained from this view. On z/OS, when the statement CREATE TRIGGER is executed, a trigger package is created. The name of the trigger package is the same as that of the trigger. The catalog table SYSIBM.SYSPACKAGE has an entry for each trigger package, and the column 'TYPE' has the value 'T' for trigger packages. The list of tables that the trigger is dependent on can be obtained from the catalog table SYSIBM.SYSPACKDEP. In z/OS, a trigger can also result in a stored procedure invocation. The catalog table SYSIBM.SYSPACKDEP has this information.

When searching for stored information system object relationships based upon triggers, using default search control parameters, all triggers that are defined on the tables that this trigger is dependent on, are also be considered during the search. All the tables that these triggers depend on are put into one group.

Packages—

The concept of a package is can vary depending upon the operating system and stored information system in use. By way of non-limiting example, in IBM's DB2® for Windows/Unix, a package is created for every separately pre-compiled source module. DB2 data manager uses the package to access the data, when the application is executed. Both static SQL procedures and stored procedures have packages. The catalog view SYSCAT.PACKAGES contains a row for each package. The view SYSCAT.STATEMENTS contains a row for each SQL statement in each package in the data. The view SYSCAT.PACKAGEDEP contains a row for each dependency that packages have on indexes, tables, views, functions, aliases, types, and hierarchies. When searching for stored information system object relationships, the search module uses the view PACKAGEDEP to find all the tables that a package is dependent on.

Information about the dependency of procedures on Stored-Procedures is not be available in the catalog view SYSCAT.PACKAGEDEP. To obtain this information, each SQL statement in the procedure is parsed.

There are other external dependencies that a package can have with other packages that cannot be found in the DB2 catalog. This information is obtained by analyzing the loader header information in the executable, or can be provided as an external relationship via the administration interface.

When searching packages based upon default search control parameters, all tables in the package and all the tables in all packages that include the same table will be grouped together.

Lobs—

Depending upon the stored information system in use, Large Objects (LOBS) are not stored directly within the stored information system table in which they are defined. In IBM's DB2® for z/OS, for example, LOBS are stored in auxiliary tables. All tables that contain LOBS are dependent on the corresponding auxiliary tables. This information can be obtained from the catalog table SYSIBM.SYS-AUXRELS. In case of Windows/Unix environment, the table space of LOBS and Long objects in the list of table spaces belonging to a particular group is retrieved. The column LONG_TBSPACE, in the view SYSCAT.TABLES holds this information.

When searching for stored information system object relationships based upon LOBS, using default search control parameters, all auxiliary tables upon which LOB references depend on are put into one group.

Stored Procedures/Queries—

Stored procedures and stored queries can include one or more executable stored information system commands that are stored within the stored information system for execution at a later time. Such executable code is likely to reference stored information system tables. By way of non-limiting example, in IBM's DB2® the SQL statements contained in the TEXT field of the catalog view SYSCAT-.STATEMENTS is parsed.

When searching for stored information system object relationships based upon stored procedures/queries, using default search control parameters, the text of each stored procedure/stored query stored within the stored information system is parsed for table references and all table references that referenced are considered during the search. All the tables that stored procedure/query references depend on are put into one group.

Non-Limiting, Representative Usage and Results of Exemplary of Discovery Techniques FIGS. 5-8 provide depict four non-limiting illustrative representations of stored information system dependency relationships that may exist between member tables in a hypothetical set of data tables: table referential constraints (FIG. 5), trigger referential constraints (FIG. 6), package referential constraints (FIG. 7) and table hierarchy constraints (FIG. 8) are provided. Although each of the four representative dependency types are presented separately, these dependencies are likely to exist simultaneously within a stored information system environment, creating a complex set of inter-table dependencies.

Figure 5:
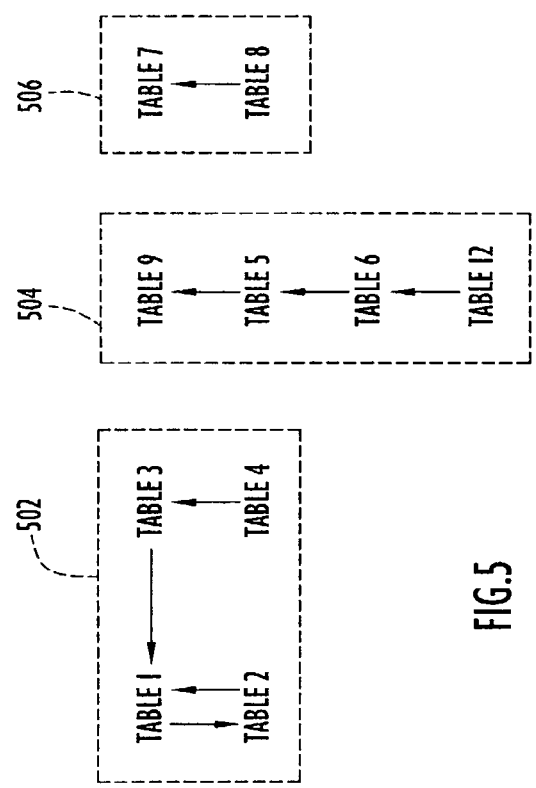
FIG. 5 depicts an illustrative representation of referential constraint based relationships that can exist between member tables (i.e., representative objects) in a hypothetical set of data tables.
Figure 6:
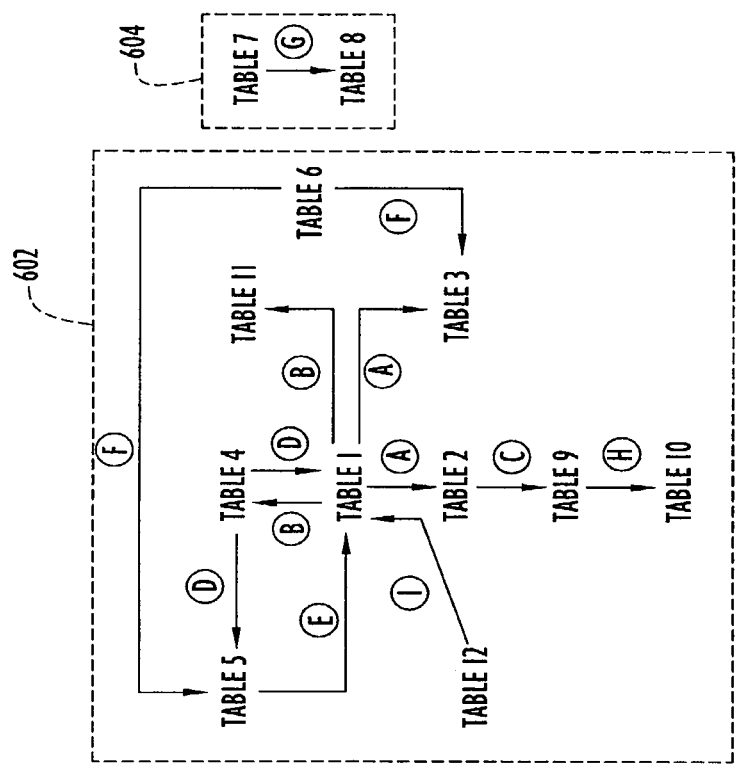
FIG. 6 depicts an illustrative representation of trigger based relationships that can exist between member tables in a hypothetical set of data tables.
Figure 7:
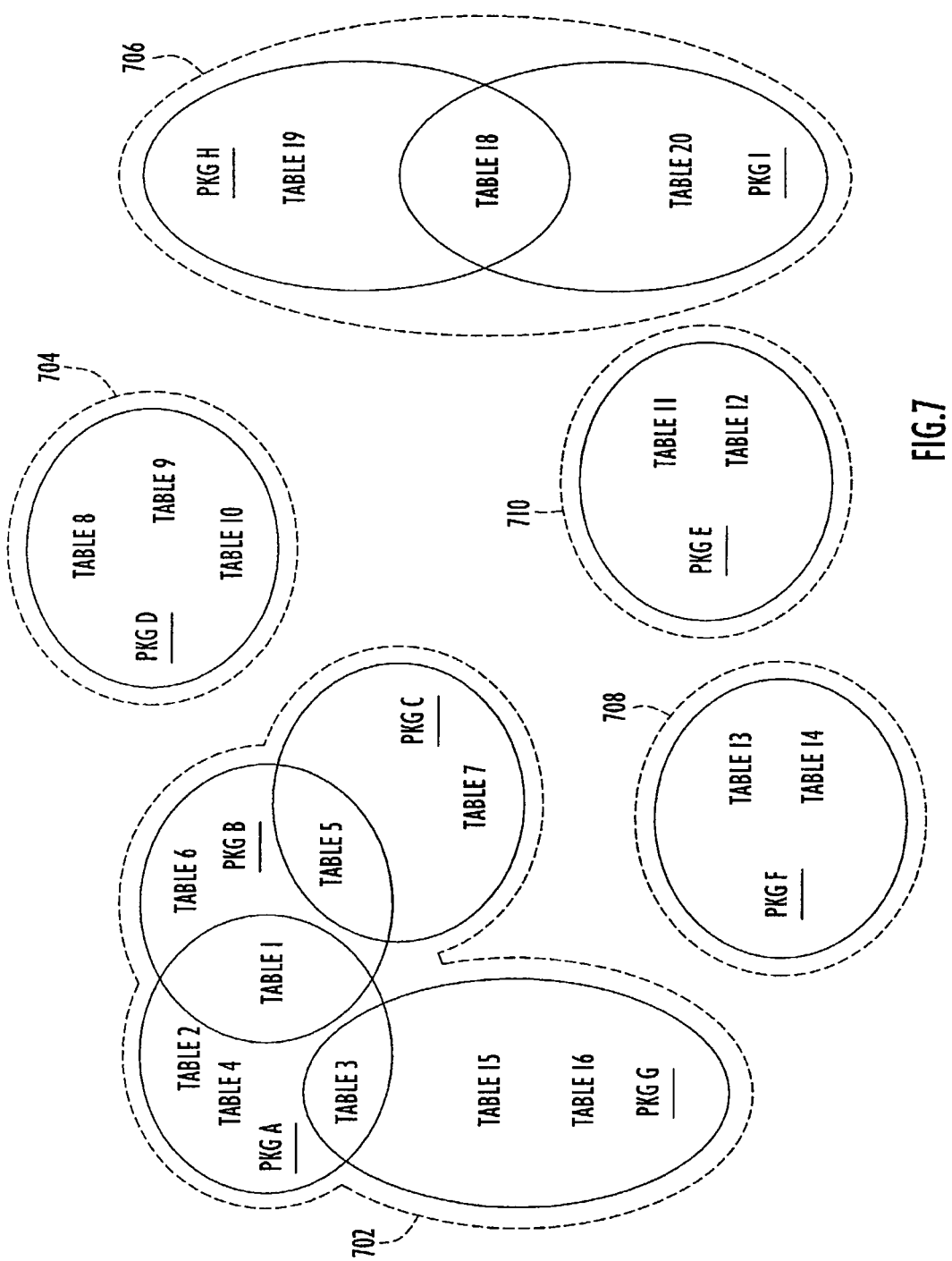
FIG. 7 depicts an illustrative representation of program-package based relationships that can exist between member tables in a hypothetical set of data tables.

Non-limiting representative examples are provided to describe in relation to each of FIG. 5 through 7. These examples address how the described stored information system object relationship search methods and techniques are used to identify object dependencies, to identify the default working sets (groups) and how administrator supplied search constraints are used to identify application sets (groups) from within the default working set groups.

Table Referential Constraints Discovery Techniques—

FIG. 5 depicts an illustrative representation of table referential constraints that may exist between member tables in a hypothetical set of data tables. The dependencies illustrated in FIG. 5 are also described in table form, below.

| Parent Table | Dependent Table |
|---|---|
| Table1 | Table2 |
| Table1 | Table3 |
| Table2 | Table1 |
| Table3 | Table4 |
| Table5 | Table6 |
| Table7 | Table8 |
| Table9 | Table5 |
| Table6 | Table12 |

| Starting Point | To Be Ignored | Externally Defined Relations |
|---|---|---|
| Empty | Empty | Empty |

By way of non-limiting example, assuming input values for parameters "Starting Point," "To Be Ignored," and "Externally Defined Relations," as defined above (i.e., empty), are used to control an object relationship search of the tables identified in FIG. 5, the search results will identify three application sets (or groups). In FIG. 5, these application sets are identified as 502, 504, and 506, wherein application set 502 contains Table1, Table2, Table3 and Table4, application set 504 contains Table5, Table6, Table9 and Table12, and application set 506 contains Table7 and Table8. Each application set consists of a set of tables between which dependencies (i.e., object relationships) have been identified. An application sets is independent from other application sets in that its tables do not share dependencies with tables in other application sets. These results are summarized in the table below, in which the application sets are designated Group1, Group2, and Group3.

| Results |
|---|
| Group1: Table1, Table2, Table3, Table4 |
| Group2: Table5, Table6, Table9, Table12 |
| Group3: Table7, Table8 |

Note that such a default search, in which no input parameters are specified, returns all application sets contained within the stored information system, which can be referred to as the default working set.

| Starting Point | To Be Ignored | Externally defined Relations |
|---|---|---|
| Table1 | | |
| Table2 | | |
| Table3 | | |
| Table5 | | |

By way of a second non-limiting example, assuming input values for parameters "Starting Point," "To Be Ignored," and "Externally Defined Relations," as defined above, are used to control an object relationship search of the tables identified in FIG. 5, the search results will identify only two application sets (or groups). The first application set will contain Table1, Table2, Table3 and Table4. The second application set will contain Table5, Table6, Table9 and Table12. These results are summarized in the table below, in which the application sets are designated Group1 and Group2.

| Results |
|---|
| Group1: Table1, Table2, Table3, Table4 |
| Group2: Table5, Table6, Table9, Table12 |

Note that having provided starting points that fell in only two of the default application set groups, the third application set is not detected.

| Starting Point | To Be Ignored | Externally Defined Relations |
|---|---|---|
| Table4 | Table3 | |
| Table12 | | |
| Table7 | | |

By way of a third non-limiting example, assuming input values for parameters "Starting Point," "To Be Ignored," and "Externally Defined Relations," as defined above, are used to control an object relationship search of the tables identified in FIG. 5, the search results will identify three application sets (or groups). The first application set will contain Table4 and Table3 (with Include flag='N,' as previously discussed). The second application set will contain Table5, Table6, Table9 and Table12. The third application set will include Table7 and Table8. These results are summarized in the table below, in which the application sets are designated Group1, Group2, and Group3.

| Result |
|---|
| Group1: Table4, Table3 (Include flag = 'N') |
| Group2: Table12, Table6, Table5, Table9 |
| Group3: Table7, Table8 |

Note that by instructing the discovery search to ignore Table3 dependencies, Table1 and Table2 are excluded from the first application set.

| Starting Point | To Be Ignored | Externally Defined Relations |
|---|---|---|
| Table4 | Table3 | |
| Table1 | | |
| Table12 | | |
| Table7 | | |

By way of a fourth non-limiting example, assuming input values for parameters "Starting Point," "To Be Ignored," and "Externally Defined Relations," as defined above, are used to control an object relationship search of the tables identified in FIG. 5, the search results will identify four separate application sets (or groups). The first application set will contain Table4 and Table3 (with Include flag='N,' as previously discussed). The second application set will contain Table5, Table6, Table9 and Table12. The third application set will include Table7 and Table8. The fourth application set will include Table1, Table2 and Table3 (with Include flag='N,' as previously discussed). These results are summarized in the table below, in which the application sets are designated Group1, Group2, Group3 and Group4.

| Result |
|---|
| Group1: Table4, Table3 (Include flag = 'N') |
| Group2: Table1, Table2, Table3 (Include flag = 'N') |
| Group3: Table12, Table6, Table5, Table9 |
| Group4: Table7, Table8 |

Note that by adding Table1 as a starting point while instructing the discovery search to ignore Table3 dependencies, the default Table1 and Table2 are included in a separate application set, even though dependencies exist between Table1 and Table3, as indicated in FIG. 5.

| Starting Point | To Be Ignored | Externally Defined Relations |
|---|---|---|
| Table2 | | Table6 depends on Table8 |
| Table6 | | |

By way of a fifth non-limiting example, assuming input values for parameters "Starting Point," "To Be Ignored," and "Externally Defined Relations," as defined above, are used to control an object relationship search of the tables identified in FIG. 5, the search results will identify only two separate application sets (or groups). The first application set will contain Table1, Table2, Table3 and Table4. The second application set will contain Table5, Table6, Table7, Table8 (via external relation, as previously discussed), Table9 and Table12. These results are summarized in the table below, in which the application sets are designated Group1 and Group2.

| Results |
|---|
| Group1: Table2, Table1, Table3, Table4 |
| Group2: Table6, Table5, Table9, Table12, Table8(External Relation), Table7 |

Note that adding an external relation between Table6 and Table8 prior to executing the discovery search has the effect of merging two of the default application sets into a single application set, as previously described.

Trigger Based Discovery Techniques —

FIG. 6 depicts an illustrative representation of trigger relationships that may exist between member tables in a hypothetical set of data tables. The dependencies illustrated in FIG. 6 are also described in table form, below.

| Trigger Name | Subject Table | Trigger Body |
|---|---|---|
| TrigA | Table1 (update) | Table2 (update), Table3 (update) |
| TrigB | Table1 (insert) | Table4 (insert), Table11 |
| TrigC | Table2 (update) | Table9 (insert) |
| TrigD | Table4 (update) | Table1 (update), Table5 (update) |
| TrigE | Table5 (update) | Table1 (insert) |
| TrigF | Table6 (update) | Table5 (update), Table3 |
| TrigG | Table7 (update) | Table8 (update) |
| TrigH | Table9 (insert) | Table10 (insert) |
| TrigI | Table12 (insert) | Table1 |

| Starting Point | To Be Ignored | Externally Defined Relations |
|---|---|---|
| Empty | Empty | Empty |

By way of non-limiting example, assuming input values for parameters "Starting Point," "To Be Ignored," and "Externally Defined Relations," as defined above (i.e., empty), are used to control an object relationship search of the tables identified in FIG. 6, the search results will identify two application sets (or groups). In FIG. 6, these application sets are identified as 602 and 604, wherein application set 602 contains Table1, Table2 (via TrigA), Table3 (via TrigA), Table4 (via TrigB), Table11 (via TrigB), Table5 (via TrigD or via TrigE), Table12 (via TrigI), Table9 (via TrigC), Table6 (via TrigF), and Table10(via TrigH) and application set 604 contains Table7 and Table8 (via TrigG). Each application set consists of a set of tables between which trigger dependencies (i.e., object relationships) have been identified. These results are summarized in the table below, in which the application sets are designated Group1 and Group2.

| Result |
| --- |
| Group1: Table1, Table2(TrigA), Table3(TrigA), Table4(TrigB), Table11(TrigB), Table5(TrigD or TrigE), Table12(TrigI), Table9(TrigC), Table6(TrigF), Table10(TrigH) |
| Group2: Table7, Table8(TrigG) |

Note that such a default search, in which no input parameters are specified, returns all application sets contained within the stored information system, which can be referred to as the default working set.

| Starting Point | To Be Ignored | Externally Defined Relations |
| --- | --- | --- |
| Table1 | | |

By way of a second non-limiting example, assuming input values for parameters "Starting Point," "To Be Ignored," and "Externally Defined Relations," as defined above, are used to control an object relationship search of the tables identified in FIG. 6, the search results will identify only a single application set (or group). The application contains the same tables identified in association with the application 602 in FIG. 6. These results are summarized in the table below, in which the application sets are designated Group1 and Group2.

| Result |
| --- |
| Group1: Table1, Table2(TrigA), Table3(TrigA), Table4(TrigB), Table11(TrigB), Table5(TrigD or TrigE), Table12(TrigI), Table9(TrigC), Table6(TrigF), Table10(TrigH) |

Note that having provided a starting point that fell in only one (i.e. 602 in FIG. 6) of the two default working set groups (i.e., 602 and 604 in FIG. 6), the second application set is not detected.

| Starting Point | To Be Ignored | Externally Defined Relations |
| --- | --- | --- |
| Table1 | | |
| Table4 | | |
| Table7 | | |

By way of a third non-limiting example, assuming input values for parameters "Starting Point," "To Be Ignored," and "Externally Defined Relations," as defined above, are used to control an object relationship search of the tables identified in FIG. 6, the search results will identify two application sets (or groups) as summarized in the table below.

| Result |
| --- |
| Group1: Table1, Table2(TrigA), Table3(TrigA), Table4(TrigB), Table11 (TrigB), Table5(TrigD or TrigE), Table12(TrigI), Table9(TrigC), Table6(TrigF), Table10(TrigH) |
| Group2: Table7, Table8(TrigG) |

Note that having provided starting points that fell in both of the two default working set groups (i.e., 602 and 604 in FIG. 6), both working set groups are detected.

| Starting Point | To Be Ignored | Externally Defined Relations |
| --- | --- | --- |
| Table6 | Table 1 | |
| Table4 | | |
| Table12 | | |

By way of a fourth non-limiting example, assuming input values for parameters "Starting Point," "To Be Ignored," and "Externally Defined Relations," as defined above, are used to control an object relationship search of the tables identified in FIG. 6, the search results will identify two separate application sets (or groups) as summarized in the table below.

| Result |
| --- |
| Group1: Table6, Table5(TrigF), Table3(TrigF), Table1(TrigE, Include flag ='N'), Table4(TrigD) |
| Group2: Table12, Table1(TrigI, Include flag ='N') |

Note that by specifying three starting points (i.e., Table4, Table6, and Table12) while instructing the discovery search to ignore Table1 trigger dependencies, the original working set group 602 (in FIG. 6) is split into two separate application sets.

| Starting Point | To Be Ignored | Externally Defined Relations |
| --- | --- | --- |
| Table6 | Table2 | Table1 depends on Table7 |
| Table4 | | |

By way of a fifth non-limiting example, assuming input values for parameters "Starting Point," "To Be Ignored," and "Externally Defined Relations," as defined above, are used to control an object relationship search of the tables identified in FIG. 6, the search results will identifies a single application sets (or group) as summarized in the table below.

| Result |
| --- |
| Group1: Table6, Table5(TrigF), Table3(TrigF), Table1(TrigE), Table4(TrigD), Table2(TrigA, Include flag = 'N'), Table11(TrigB), Table12(Trig1), Table7(user-defined relationship), Table8(TrigG) |

Note that adding an external relation between Table1 and Table7 prior to executing the discovery search has the effect of merging two of the default working sets into a single application set. However, the combined application set does not include all of the tables included in the original working set group 602 (FIG. 6) given that Table2 dependencies are ignored.

Package Based Discovery Techniques—

The concept of a package is can vary depending upon the operating system and stored information system in use. By way of non-limiting example, in IBM's DB2® for Windows/Unix, a package is created for every separately pre-compiled source module. DB2 data manager uses the package to access the data, when the application is executed. Both static SQL procedures and stored procedures have packages. FIG. 7 depicts an illustrative representation of package relationships that may exist between member tables in a hypothetical set of data tables. The package dependencies illustrated in FIG. 7 are also described in table form, below. For example, based upon FIG. 7 and the table below, PackageA is described has containing references (i.e., dependencies) to Table1, Table2, Table3 and Table4.

| Package Name | Tables |
|---|---|
| PkgA | Table1, Table2, Table3, Table4 |
| PkgB | Table1, Table5, Table6 |
| PkgC | Table5, Table7 |
| PkgD | Table8, Table9, Table10 |
| PkgE | Table11, Table12 |
| PkgF | Table13, Table14 |
| PkgG | Table15, Table16, Table3 |
| PkgH | Table18, Table19 |
| PkgI | Table18, Table20 |

| Starting Point | To Be Ignored | Externally Defined Relations |
|---|---|---|
| Empty | Empty | Empty |

By way of non-limiting example, assuming input values for parameters "Starting Point," "To Be Ignored," and "Externally Defined Relations," as defined above (i.e., empty), are used to control an object relationship search of the tables identified in FIG. 7, the search results will identify five application sets (or groups). In FIG. 7, these application sets are identified as 702 704, 706, 708, and 710, wherein application set 702 contains Table1(via PackageA and PackageB), Table2 (via PackageA), Table3 (via PackageA and PackageG), Table4 (via PackageA), Table5 (via PackageB and PackageC), Table6 (via PackageB), Table7 (via PackageC), Table15(via PackageG) and Table16(via PackageG). Similarly, application set 704 contains Table8, Table9 and Table10(all via PackageD). Each application set consists of a set of tables called by one or more common application packages. These results are summarized in the table below, in which the application sets are designated Group1 through Group5.

| Result |
|---|
| Group1: Table1(PkgA&B), Table2(PkgA), Table3(PkgA&G), Table4(PkgA), Table5(PkgB&C), Table6(PkgB), Table7((PkgC), Table15(PkgG), Table16(PkgG) |
| Group2: Table8(PkgD), Table9(PkgD), Table10(PkgD) |
| Group3: Table11(PkgE), Table12(PkgE) |
| Group4: Table13(PkgF), Table14(PkgF) |
| Group5: Table18(PkgH&I), Table19(PkgH), Table20(PkgI) |

Note that such a default search, in which no input parameters are specified, returns all application sets contained within the stored information system, which can be referred to as the default working set.

| Starting Point | To Be Ignored | Externally Defined Relations |
|---|---|---|
| Table1 Table11 | | |

By way of a second non-limiting example, assuming input values for parameters "Starting Point," "To Be Ignored," and "Externally Defined Relations," as defined above, are used to control an object relationship search of the tables identified in FIG. 7, the search results will identify two application sets (or groups). The application set contains the same tables identified in association with the application 702 and 710 in FIG. 7. These results are summarized in the table below, in which the application sets are designated Group1 and Group2.

| Result |
|---|
| Group1: Table1, Table2(PkgA), Table3(PkgA), Table4(PkgA), Table5(PkgB), Table6(PkgB), Table15(PkgG), Table16(PkgG), Table7(PkgC) |
| Group2: Table11, Table12(PkgE) |

Note that having provided starting points that fell in two of the two default working set groups (i.e. 702 and 710 in FIG. 7), the remaining three working set groups (i.e., 704, 706 and 708 in FIG. 7) are not detected.

| Starting Point | To Be Ignored | Externally Defined Relations |
|---|---|---|
| Table5 Table15 | Table1 | |

By way of a third non-limiting example, assuming input values for parameters "Starting Point," "To Be Ignored," and "Externally Defined Relations," as defined above, are used to control an object relationship search of the tables identified in FIG. 7, the search results will identify two separate application sets (or groups) as summarized in the table below.

| Result |
|---|
| Group1: Table5, Table6(PkgB), Table1(PkgB, Include flag = 'N'), Table7(PkgC) |
| Group2: Table15, Table16(PkgG), Table3(PkgG), Table1(PkgA, Include Flag = 'N'), Table2(PkgA), Table4(PkgA) |

Note that by specifying two starting points (i.e., Table5 and Table15) which are both associated with a common working set 702, while instructing the discovery search to ignore Table1 package dependencies, the original working set group 702 (in FIG. 7) is split into two separate application sets.

| Starting Point | To Be Ignored | Externally Defined Relations |
|---|---|---|
| Table5 Table 11 | Table1 PkgC | Table12 and Table18 |

By way of a fourth non-limiting example, assuming input values for parameters "Starting Point," "To Be Ignored," and "Externally Defined Relations," as defined above, are used to control an object relationship search of the tables identified in FIG. 7, the search results will identifies two application sets (or groups) as summarized in the table below.

| Result |
| --- |
| Group1: Table5, Table6(PkgB), Table 1(PkgB, Include flag = 'N') |
| Group2: Table 11, Table 12(PkgE), Table 18(Externally Defined), Table 19(PkgH), Table20(PkgI) |

Note that by specifying two starting points (i.e., Table5 and Table11) which are both associated with two separate working sets (i.e., 702 and 710 if FIG. 7), while instructing the discovery search to ignore package dependencies relating to Table 1 and all tables in PackageC, and setting an external relation between Table12 and Table18 prior to executing the discovery search, the original working set group 702 (in FIG. 7) is limited to only those tables associated with PackageB (i.e., new Group1) and original working sets 710 and 706 are combined (i.e., new Group2).

| Starting Point | To Be Ignored | Externally Defined Relations |
| --- | --- | --- |
| Table5 | PkgA | Table 13 and Table2 |
| Table3 | PkgC | PkGG and PkgF |

By way of a fifth non-limiting example, assuming input values for parameters "Starting Point," "To Be Ignored," and "Externally Defined Relations," as defined above, are used to control an object relationship search of the tables identified in FIG. 7, the search results will identify two application sets (or groups) as summarized in the table below.

| Result |
| --- |
| Group1: Table5, Table6(PkgB), Table 1(PkgB) |
| Group2: Table3, Table15(PkgG), Table16(PkgG), Table3(PkgF, externally defined), Table14(PkgF, externally defined), Table2(Externally defined Relation) |

Note that by specifying a starting object (i.e., Table5) that is associated with PackageB and PackageC, while instructing the discovery search to ignore package dependencies relating to PackageA and PackageC, results in the discovery of a Group1 that contains only those tables within PackageB. Further, note that specifying a starting object (i.e., Table3) that is associated with PackageA and PackageG, while instructing the discovery search to ignore package dependencies relating to PackageA and PackageC, and while identifying external relationships between Table13 and Table2 and between PkgG and PkgF, results in the discovery of Group2 that merges PackageF, PackageG, while including only one additional table from PackageA (i.e., Table2, for which a relationship was specified despite the exclusion of PackageA dependencies).

Despite the complexity of the object relationships interwoven across the information maintained by the stored information system, the methods and techniques described here create a controlled environment in which data object relationships are discovered and managed in an efficient and effective manner. Multiple object relationship discovery techniques are described that allow a complete set of object dependencies (i.e., relationships) to be identified. Techniques are used to extract object relationships from metadata embedded throughout the stored information system in system tables, data tables, stored procedures, queries, etc. Techniques are described to scan trace/log files and identify dynamic relationships created by software programs executed by the stored information system. Furthermore, the methods and techniques described include multiple techniques (i.e., user search constraints, user defined relationships, XML input files, etc.) that allow a user to include object relationships that are not discoverable by other means.

The methods and techniques described facilitate identification of related application sets of stored information system tables and allow application set information to enhance the effective administration of stored information system resources to sustain optimized stored information system efficiency and data availability. Table information associated with an application set object dependencies are translated into a format that can be directly used by other stored information system administration tools (such as IBM's Recovery Expert) and are made accessible to application developers via a generic API. This table information provides precise tablespace and volume information related to tables associated with a selected application set. With this information, the administration tools that perform stored information system archival backups, for example, are able to perform highly tailored yet complete volume/file backups and restores that contain all the tables and information required to support the application or stored information system capability associated with the selected application set (i.e., the consistency of the application set is assured). Furthermore, such precise tablespace and volume information can be used to assist other stored information system administration tools such as those designed to assist with physically/logically segmenting data objects, replicating data objects, optimizing the distribution of data in distributed data system, estimating operational capacity, etc.

It will be appreciated that the embodiments described above and illustrated in the drawings represent only a few of the many ways of implementing a system capable of supporting a stored information system administrative tool for discovering, recording and maintaining stored information system object relationships and for managing the stored information system based upon knowledge of application sets of related objects that support an identified stored information system application/capability.

The user/administrative and stored information system server computer systems described here can be implemented by any quantity of any personal or other type of computer system (e.g., personal computer, mid-sized server, mainframe, etc.). The computer systems of the present invention can include any commercially available operating system. These computer systems can further include commercially available or custom software (e.g., server software, browser software, etc.), and various types of input devices (e.g., keyboard, mouse, voice recognition, etc.). It is to be understood that the software for these computer systems can be implemented in virtually any desired computer language and can be developed by one of ordinary skill in the computer arts based on the descriptions contained here and the examples provided via text and illustrated in the drawings. The computer systems, alternatively, can be implemented by hardware or other processing circuitry. The various functions of the computer systems can be distributed in a variety of manners among practically any quantity of computer or processing systems or circuitry and/or among practically any quantity of software and/or hardware units or modules. The software and/or algorithms described above and illustrated in the flow charts can be modified in a manner that accomplishes the functions described herein.

The network can be implemented by practically any communications network (e.g., LAN, WAN, Internet, Intranet, etc.). The server and end-user computer systems can include any conventional or other communications devices to communicate over the network. The data can be implemented by practically any quantity of conventional or other databases, storage units or structures (e.g., file, data structure, etc.), can be arranged in practically any fashion and can store practically any desired information. The stored information system can include practically any quantity of tables, application packages, stored procedures/queries, triggers, etc., that reveal any quantity of stored information system object relationships which can be logically related to define any number application sets (or groups).

Object relationship discovery techniques may be implemented in any order and repeated periodically or randomly to maintain the accuracy of the object relationship information based established. Execution of discovery techniques may be scheduled for automated execution or initiated manually. Discovery techniques can be initiated via the administration interface, or via a system operating system or application command line prompt. Object relationship and application set information discovered, received and/or generated by a tool implementing the described discovery techniques may be stored internally to the stored information system and used by stored information system applications and stored information system supported administration tools and/or exported (e.g., via XML formatted file or other application interface) for use by external applications and external administration tools.

The present invention is not limited to the specific applications disclosed herein, but can be used in substantially the same manner described above to search through practically any types of data or information arranged or categorized in practically any fashion.

Having described a method and apparatus for discovering, storing and maintaining stored information system object relationship information, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of discovering relationships among objects in a stored information system, comprising:
generating or updating an application set of a plurality of application sets, wherein the application set comprises both static and dynamic relationships between a set of objects associated with an application or capability supported by the stored information system, wherein the set of objects of the application set is handled and maintained as a consistent unit over time, and wherein the set of objects comprise one or more of files, database tables, or metadata;
identifying a first set of object relationships using static entity relationship discovery that identifies relationships between objects using one or more of stored system catalogs, data structures, or data tables;
populating the application set based on the first set of object relationships;
identifying a second set of object relationships using dynamic entity relationship discovery that identifies relationships between objects, wherein the relationships between objects are dynamically established during the stored information system execution of program code, wherein dynamic entity relationship discovery comprises at least the steps of:
identifying dependencies between database tables by searching structured query language (SQL) trace files, SQL log files, or both for the dependencies by extracting relationship metadata resulting from usage of the stored information system, wherein the SQL trace, the SQL log files, and the dependencies are dynamically established by programs of the stored information system upon executing dynamic SQL in response to a user instruction; and
storing the identified dependencies,
wherein the searching comprises searching SQL query syntax of the dynamic SQL in any of the SQL trace and the SQL log files;
updating the application set to include the second set of object relationships in addition to the first set of object relationships.

2. The method of claim 1, wherein one or both of identifying the first set of object relationships or identifying the second set of object relationships comprises searching referential integrity constraints.

3. The method of claim 1, wherein one or both of identifying the first set of object relationships or identifying the second set of object relationships comprises searching trigger definitions.

4. The method of claim 1, wherein one or both of identifying the first set of object relationships or identifying the second set of object relationships comprises searching data hierarchy relationships.

5. The method of claim 1, wherein one or both of identifying the first set of object relationships or identifying the second set of object relationships comprises searching data table column references.

6. The method of claim 1, wherein one or both of identifying the first set of object relationships or identifying the second set of object relationships comprises tracing application execution.

7. The method of claim 1, wherein one or both of identifying the first set of object relationships or identifying the second set of object relationships comprises tracing database execution.

8. The method of claim 1, wherein one or both of identifying the first set of object relationships or identifying the second set of object relationships comprises tracing stored procedure execution.

9. The method of claim 1, wherein one or both of identifying the first set of object relationships or identifying the second set of object relationships comprises tracing application package execution.

10. The method of claim 1, further comprising:
receiving user inputs identifying a third set of object relationships;
updating the application set to include the third set of object relationships in addition to the first set of object relationships and the second set of object relationships.

11. The method of claim 10, wherein the third set of object relationships comprises dependencies relating to relationships that are different from information within the stored information system.

12. The method of claim 1, wherein one or both of identifying the first set of object relationships or identifying the second set of object relationships comprises receiving data object dependency information via a file interface.

13. The method of claim 1, further comprising receiving and processing search instructions to identify the dependencies.

14. The method of claim 13, wherein the search instructions include a starting object.

15. The method of claim 14, wherein the starting object includes one of a table or a package.

16. The method of claim 13, wherein the search instructions include a plurality of objects between which a relationship exists.

17. The method of claim 13, wherein the search instructions include a plurality of tables between which a relationship exists.

18. The method of claim 1, wherein storing identified dependencies further comprises storing information related to subsets of objects.

19. The method of claim 18, wherein storing information related to subsets of objects comprises storing relationships between objects that are used by an application in common with the objects.

20. The method of claim 1, further comprising managing objects based upon the stored dependencies.

21. The method of claim 20, wherein the managing comprises performing administrative procedures based upon the stored dependencies.

22. The method of claim 21, wherein administrative procedures are performed upon a subset of objects, based upon the stored dependencies.

23. The method of claim 22, wherein the subset of objects is used by an application in common with the subset of objects.

24. The method of claim 22, wherein the stored dependencies include manually defined dependencies relating to relationships that are different from information within the stored information system.

25. The method of claim 20, wherein the managing comprises creating a backup archive.

26. The method of claim 20, wherein the managing comprises restoring from an archive.

27. The method of claim 20, wherein the managing comprises at least one of: allocating table space, physically segmenting data objects; logically segmenting data objects; replicating data objects; optimizing the distribution of data in a distributed data system; and estimating operational capacity.

28. The method of claim 1, wherein the stored information system is a database.

29. The method of claim 1, wherein extracting relationship metadata resulting from the usage of the stored information system comprises parsing the SQL query syntax of the dynamic SQL in any of the SQL trace and the SQL log files.

30. An apparatus including computer-executable instructions stored on a non-transitory computer-readable medium for discovering relationships among objects in a stored information system, the apparatus comprising:
   a storage/management module configured to organize object relationship information collected into application sets and store the object relationship information within the stored information system, wherein each application set comprises both static and dynamic relationships between a set of objects associated with an application or capability supported by the stored information system, wherein the set of objects of the application set is handled and maintained as a consistent unit over time, and wherein the set of objects comprise one or more of files, database tables, or metadata;
   a search module configured to:
      identify a first set of object relationships using static entity relationship discovery that identifies relationships between objects using one or more of stored system catalogs, data structures, or data tables;
      identify a second set of object relationships using dynamic entity relationship discovery that identifies relationships between objects, wherein the relationships between objects are dynamically established during the stored information system execution of program code, wherein dynamic entity relationship discovery comprises at least the step of searching structured query language (SQL) trace files, SQL log files, or both to identify dependencies between database tables by extracting relationship metadata resulting from usage of the stored information system, wherein any of the SQL trace files, SQL log files, and the dependencies are dynamically established by programs of the stored information system upon executing dynamic SQL in response to a user instruction;
   wherein the storage/management module is further configured to:
      populate a respective application set based on the first set of object relationships; and
      update the respective application set to include the second set of object relationships in addition to the first set of object relationships.

31. The apparatus of claim 30, wherein one or both of identifying the first set of object relationships or identifying the second set of object relationships comprises searching SQL query syntax.

32. The apparatus of claim 30, wherein one or both of identifying the first set of object relationships or identifying the second set of object relationships comprises searching referential integrity constraints.

33. The apparatus of claim 30, wherein one or both of identifying the first set of object relationships or identifying the second set of object relationships comprises searching trigger definitions.

34. The apparatus of claim 30, wherein one or both of identifying the first set of object relationships or identifying the second set of object relationships comprises searching data hierarchy relationships.

35. The apparatus of claim 30, wherein one or both of identifying the first set of object relationships or identifying the second set of object relationships comprises searching data table column references.

36. The apparatus of claim 30, wherein one or both of identifying the first set of object relationships or identifying the second set of object relationships comprises tracing application execution.

37. The apparatus of claim 30, wherein one or both of identifying the first set of object relationships or identifying the second set of object relationships comprises tracing database execution.

38. The apparatus of claim 30, wherein one or both of identifying the first set of object relationships or identifying the second set of object relationships comprises tracing stored procedure execution.

39. The apparatus of claim 30, wherein one or both of identifying the first set of object relationships or identifying the second set of object relationships comprises tracing application package execution.

40. The apparatus of claim 30, wherein the search module is further configured to:
   receive user inputs identifying a third set of object relationships;
   update the respective application set to include the third set of object relationships in addition to the first set of object relationships and the second set of object relationships.

41. The apparatus of claim 40, wherein the third set of object relationships comprises dependencies relating to relationships that are different from information within the stored information system.

42. The apparatus of claim 30, wherein one or both of identifying the first set of object relationships or identifying the second set of object relationships comprises receiving data object dependency information via a file interface.

43. The apparatus of claim 42, wherein the administration interface module is configured to process instructions to manage objects based upon the stored dependencies.

44. The apparatus of claim 43, wherein managing objects includes performing administrative procedures based upon the stored dependencies.

45. The apparatus of claim 44, wherein administrative procedures are performed upon a subset of objects, based upon the stored dependencies.

46. The apparatus of claim 45, wherein the subset of objects is used by an application or capability associated with a respective application set.

47. The apparatus of claim 45, wherein the stored dependencies include manually defined dependencies relating to relationships that are different from information within the stored information system.

48. The apparatus of claim 43, wherein managing objects includes creating a backup archive.

49. The apparatus of claim 43, wherein managing objects includes restoring from an archive.

50. The apparatus of claim 43, wherein managing objects includes at least one of: allocating table space, physically segmenting data objects; logically segmenting data objects; replicating data objects; optimizing the distribution of data in a distributed data system; and estimating operational capacity.

51. The apparatus of claim 30, further comprising an administration interface module configured to process instructions specified by an administrator to control the searches for the dependencies and control the storage of the dependencies identified by the search module into respective application sets.

52. The apparatus of claim 51, wherein the search module is configured to identify dependencies related to subsets of objects based upon search instructions processed by the administration interface module.

53. The apparatus of claim 52, wherein the search instructions include a starting object for the searching.

54. The apparatus of claim 53, wherein the starting object includes one of a table and a package.

55. The apparatus of claim 51, wherein the administration interface module is configured to export the stored dependency information to the storage/management module to update or generate the application sets.

56. The apparatus of claim 52, wherein the search instructions identify a plurality of objects between which a relationship exists.

57. The apparatus of claim 52, wherein the search instructions identify a plurality of tables between which a relationship exists.

58. The apparatus of claim 30, wherein the storage/management module is configured to store identified dependencies related to subsets of objects based upon instructions processed by the administration interface module.

59. The apparatus of claim 58, wherein storing identified dependencies further comprises storing information related to subsets of objects.

60. The apparatus of claim 59, wherein storing information related to subsets of objects comprises storing relationships between objects that are used by an application or capability associated with a respective application set.

61. The apparatus of claim 30, wherein the stored information system is a database.

* * * * *